United States Patent
Fang

(10) Patent No.: US 9,438,134 B2
(45) Date of Patent: Sep. 6, 2016

(54) SYSTEM AND METHOD FOR OFF-LINE UPS

(75) Inventor: Sheng-Shien Fang, New Taipei (TW)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 672 days.

(21) Appl. No.: 13/074,697

(22) Filed: Mar. 29, 2011

(65) Prior Publication Data
US 2012/0248875 A1     Oct. 4, 2012

(51) Int. Cl.
| H02J 9/00 | (2006.01) |
| H02J 9/06 | (2006.01) |
| H02M 7/537 | (2006.01) |
| H02M 7/42 | (2006.01) |

(52) U.S. Cl.
CPC ............... *H02M 7/42* (2013.01); *H02J 9/062* (2013.01); *Y10T 307/625* (2015.04)

(58) Field of Classification Search
None
See application file for complete search history.

(56) References Cited

U.S. PATENT DOCUMENTS

| 5,790,391 A | 8/1998 | Stich et al. |
| 8,116,105 B2 | 2/2012 | Klikic et al. |
| 8,405,372 B2 | 3/2013 | Chen et al. |
| 8,810,190 B2 | 8/2014 | Kelley |
| 2008/0042606 A1* | 2/2008 | Chen .......................... 318/474 |
| 2009/0201703 A1 | 8/2009 | Klikic et al. |
| 2010/0117588 A9* | 5/2010 | Kelley .......................... 318/812 |
| 2010/0141035 A1* | 6/2010 | Chen et al. ..................... 307/64 |

FOREIGN PATENT DOCUMENTS

| CN | 101855813 A | 10/2010 |
| CN | 101960692 A | 1/2011 |
| TW | 201023476 A | 6/2010 |
| WO | 2010/150217 A2 | 12/2010 |
| WO | WO 2010/150217 A2 * | 12/2010 |

OTHER PUBLICATIONS

International Search Report and Written Opinion from corresponding PCT/US2012/030914 mailed Aug. 28, 2012.

* cited by examiner

*Primary Examiner* — Jared Fureman
*Assistant Examiner* — Aqeel Bukhari
(74) *Attorney, Agent, or Firm* — Lando & Anastasi, LLP

(57) ABSTRACT

A method of operating an uninterruptible power supply (UPS) includes generating, during a portion of an output cycle, a substantially sinusoidal output voltage responsive to a plurality of pulse width modulation (PWM) control signals provided to a power conversion circuit of the UPS, comparing the output voltage to a reference root mean square (RMS) voltage at each of a plurality of time intervals during the portion of the output cycle, calculating a PWM control signal scaling factor based on each of the comparisons to the reference RMS voltage, and maintaining the output voltage at substantially the reference RMS voltage by applying the calculated PWM control signal scaling factor to at least one of the plurality of PWM control signals. The method may include detecting that the output voltage has reached a maximum output voltage level and clamping the output voltage to a steady state output voltage reference level.

20 Claims, 9 Drawing Sheets

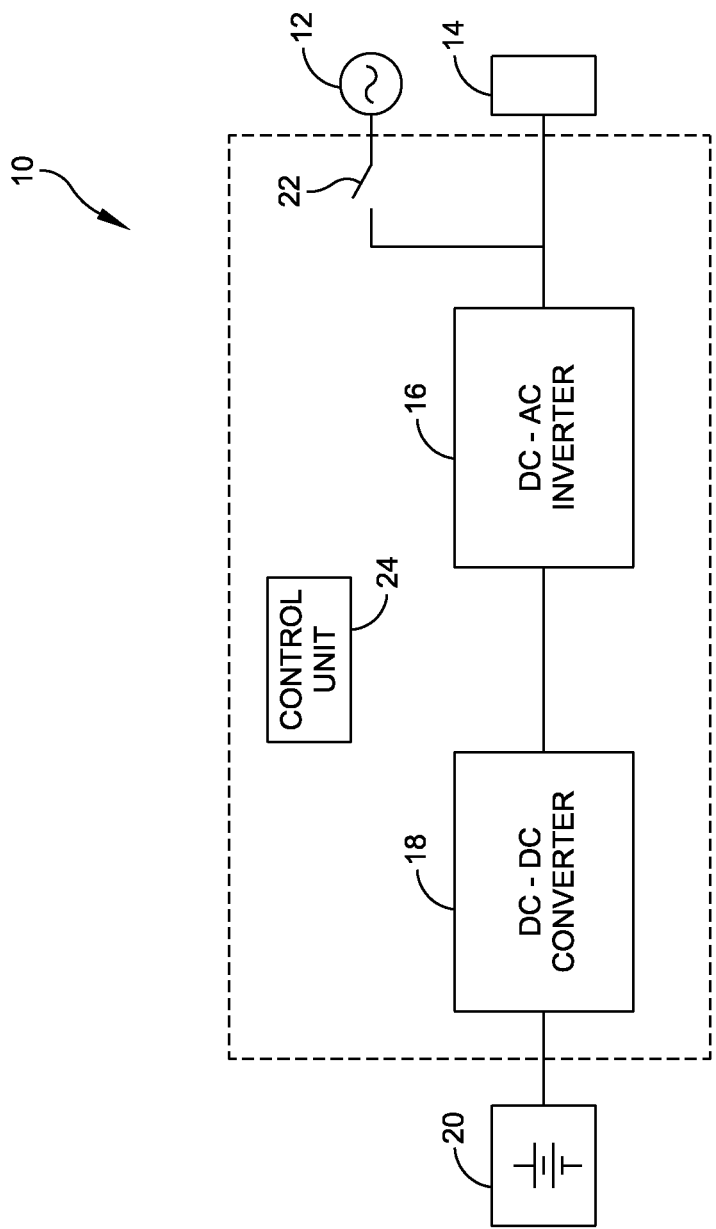

SYSTEM AND METHOD FOR OFF-LINE UPS

BACKGROUND OF THE INVENTION

1. Field of the Invention

Embodiments of the present invention relate generally to DC-AC power conversion, and more particularly, to output waveform control for uninterruptible power supplies.

2. Discussion of Related Art

Uninterruptible power supplies (UPS) are used to provide continuous power to a load when the primary power source, or mains, fails or is interrupted. Typical loads include computer systems with critical power requirements, but other loads, such as heating/cooling/ventilation systems, lighting systems, and televisions may also be supported by a UPS. One type of UPS is called a standby or off-line UPS. A standby UPS may be configured such that the load draws normally power directly from mains power. When mains power is not available, the load instead draws power from a battery. The standby UPS is typically designed to provide temporary power to the load for anywhere between five minutes and one hour, depending on the amount of power consumed by the load and the charge and capacity of the battery.

BRIEF SUMMARY OF THE INVENTION

According to one embodiment of the present disclosure, a method of operating an uninterruptible power supply (UPS) includes generating, during a portion of an output cycle, a substantially sinusoidal output voltage responsive to a plurality of pulse width modulation (PWM) control signals provided to a power conversion circuit of the UPS, comparing the output voltage to a reference root mean square (RMS) voltage at each of a plurality of time intervals during the portion of the output cycle, calculating a PWM control signal scaling factor based on each of the comparisons to the reference RMS voltage, and maintaining the output voltage at substantially the reference RMS voltage by applying the calculated PWM control signal scaling factor to at least one of the plurality of PWM control signals. In another embodiment, the method may include detecting that the output voltage has reached a maximum output voltage level and, in response thereto, clamping the output voltage to a steady state output voltage reference level. At least one of the plurality of PWM control signals may be configured to generate a fundamental frequency component of the output voltage, a third harmonic component of the output voltage, and/or a fifth harmonic component of the output voltage.

In another embodiment, the method may include maintaining the output voltage at substantially the reference RMS voltage at one of a phase angle of approximately 45 degrees and a phase angle of approximately 135 degrees by calculating a third harmonic scaling factor based on the comparisons to the reference RMS voltage, and applying the third harmonic scaling factor to at least one of the plurality of PWM control signals. In another embodiment, the method may include maintaining the output voltage at substantially the output voltage reference within a first phase angle range of between approximately zero degrees and approximately 45 degrees and within a second phase angle range of between approximately 135 degrees and approximately 180 degrees by calculating a third harmonic scaling factor based on the comparisons to the output voltage reference, and applying the third harmonic scaling factor to at least one of the plurality of PWM control signals. In yet another embodiment, the method may include maintaining the output voltage at substantially the reference RMS voltage at one of a phase angle of approximately 90 degrees and a phase angle of approximately 270 degrees by calculating a fifth harmonic scaling factor based on the comparisons to the reference RMS voltage, and applying the fifth harmonic scaling factor to at least one of the plurality of PWM control signals.

In another embodiment, the method may include maintaining the substantially sinusoidal shape of the output voltage by calculating a transient response scaling factor based on a transient response of the output voltage to a change in a load, and applying the transient response scaling factor to at least one of the plurality of PWM control signals.

According to another embodiment of the present disclosure, an uninterruptible power supply system includes a backup power source, an output configured to provide an AC output voltage to a load, a power conversion circuit coupled to the backup power source and the output for generating the AC output voltage, and means for controlling the power conversion circuit to generate, during a portion of an output cycle, a substantially sinusoidal output voltage using a plurality of pulse width modulation (PWM) control signals.

According to another embodiment of the present disclosure, an uninterruptible power supply (UPS) system includes a backup power source, an output configured to provide an AC output voltage to a load, a power conversion circuit coupled to the backup power source and the output for generating the AC output voltage from the backup power source in a backup mode of operation, and a controller coupled to the power conversion circuit. The controller is configured to operate the power conversion circuit during a portion of an output cycle using a plurality of pulse width modulation (PWM) control signals that when applied to the power conversion circuit causes the AC output voltage to be generated, compare the AC output voltage to a reference voltage at each of a plurality of time intervals during the portion of the output cycle, calculate a PWM control signal scaling factor based on each of the comparisons to the reference voltage, and maintain the AC output voltage at substantially the reference voltage by adjusting a width of at least one of the PWM control signals using the PWM control signal scaling factor.

In another embodiment, the reference voltage may be a first reference voltage. The controller may be configured to detect that the output voltage has reached a maximum output voltage level and, in response thereto, to clamp the AC output voltage to a second reference voltage. In another embodiment, the controller may be configured to maintain the AC output voltage at substantially the first reference voltage at one of a phase angle of approximately 45 degrees and a phase angle of approximately 135 degrees by calculating a third harmonic scaling factor based on comparisons to the first reference voltage, and to adjust a width of the at least one of the PWM control signals using the third harmonic scaling factor. In another embodiment, the controller may be configured to maintain the AC output voltage at substantially the first reference voltage at one of a phase angle of approximately 90 degrees and a phase angle of approximately 270 degrees by calculating a fifth harmonic scaling factor based on comparisons to the first reference voltage, and to adjust the width of the at least one of the PWM control signals using the fifth harmonic scaling factor to. In yet another embodiment, the controller may be configured to calculate a transient response scaling factor based on a transient response of the AC output voltage to a change in the load, and to adjust a width of the at least one of the PWM control signals using the transient response scaling factor.

In another embodiment, the controller may be configured to generate a plurality of PWM control signals to control the power conversion circuit to generate a substantially sinusoidal waveform. In yet another embodiment, the controller may be configured to generate a plurality of PWM control signals to control the power conversion circuit to generate a substantially trapezoidal waveform.

In another embodiment, the controller may be configured to compare a sensed battery voltage to the first reference voltage at each of the plurality of regular time intervals during the first portion of the output cycle, and to calculate the PWM control signal scaling factor based on the comparison of the sensed battery voltage to the first reference voltage. In yet another embodiment, the system may include means for generating the plurality of PWM control signals. In one embodiment, the system may include a memory coupled to the controller. The memory may contain at least one table of values that is to be used by the means for generating the plurality of PWM control signals.

BRIEF DESCRIPTION OF THE DRAWINGS

In the drawings, each identical or nearly identical component that is illustrated in various figures is represented by a like numeral. For purposes of clarity, not every component may be labeled in every drawing. For a better understanding of the present disclosure, reference is made to the figures which are incorporated herein by reference and in which:

FIG. 1 is a schematic diagram of a power converter system in accordance with one embodiment of the present disclosure;

DETAILED DESCRIPTION OF THE INVENTION

Figure 2A:
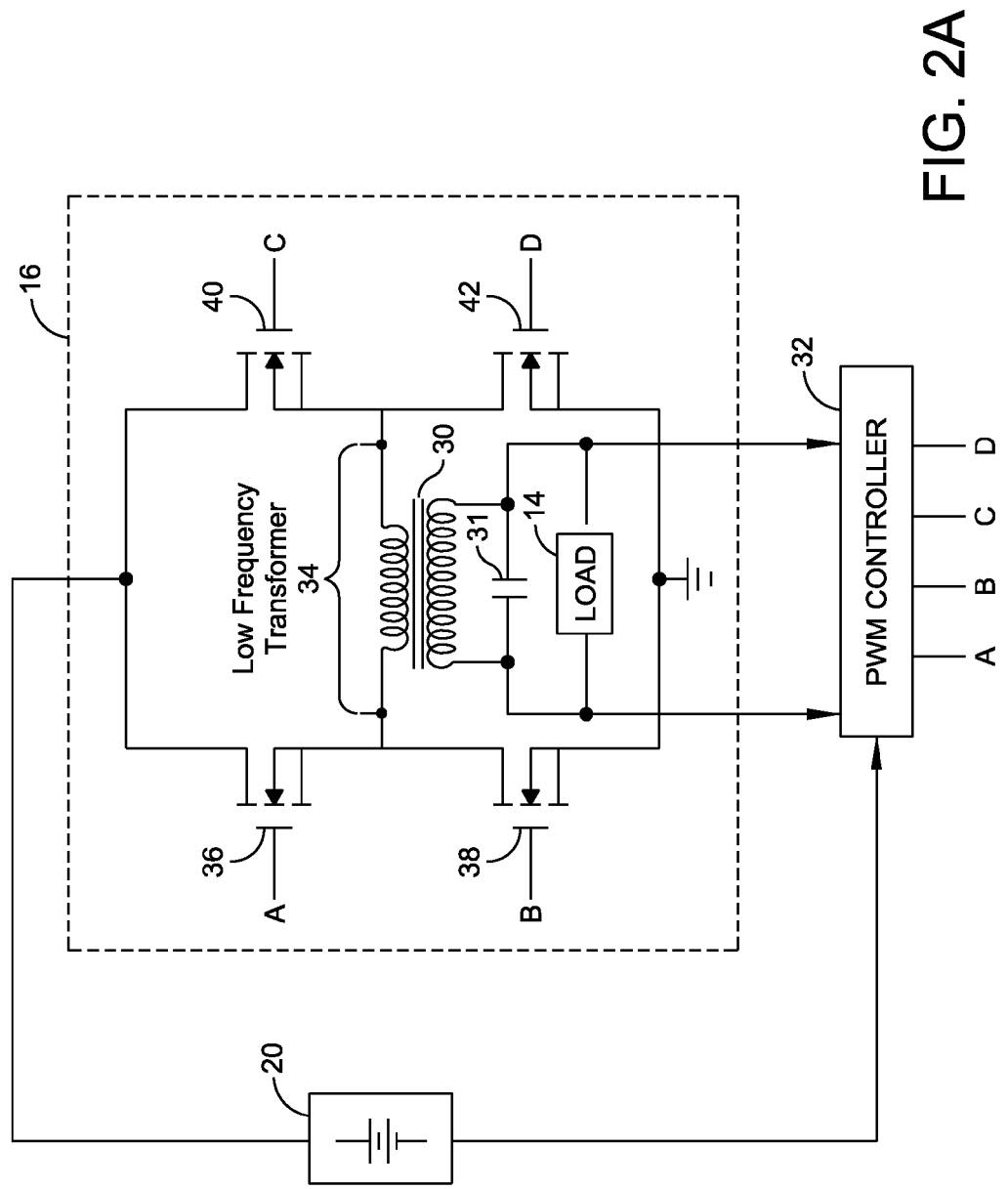
FIG. 2A is a schematic diagram of a portion of the system of FIG. 1 in accordance with another embodiment of the present disclosure.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The disclosure is capable of other embodiments and of being practiced or carried out in various ways. Also the phraseology and terminology used herein is for the purpose of description and should not be regarded as limiting. The use of "including," "comprising," "having," "containing," "involving," and variations thereof herein, is meant to encompass the items listed thereafter and equivalents thereof, as well as additional items.

Embodiments of the present invention relate to power conversion, such as DC-AC power conversion provided in an uninterruptible power supply (UPS). As discussed above, a UPS provides a source of backup power in the event that the primary power source fails. UPS systems come in a variety of sizes and forms, including those specifically intended for home use, such as with personal computers, televisions, air conditioners, lighting and other equipment that one desires to operate at any time. Such systems are popular with consumers desiring or requiring protection from power disruptions, particularly in regions where utility power (also referred to herein as "mains" or "mains power") may be unreliable due to weather or other conditions. A home UPS system typically uses a low-voltage (e.g., 12 V, 24 V, or 48 V), high ampere hour battery as the backup power source.

The UPS may perform several functions. When the UPS is providing backup power, it converts power from the low-voltage DC battery into, for example, 120V or 240V AC for powering the electrical equipment. When not in use, the battery is charged using mains power to help ensure that an adequate supply of backup power is ready when mains power becomes unavailable. The UPS typically includes a rectifier for converting AC power to DC power for charging the battery, and an inverter for converting DC power from the battery to AC power for supplying the load. According to various embodiments, the inverter may be controlled (e.g., by an integrated control unit) to provide power from the battery to the load at the same frequency and with substantially the same waveform as the normal AC mains power, that is, substantially sinusoidal.

FIG. 1 shows a schematic of a power conversion system 10 according to one embodiment of the present disclosure. The system 10 is coupled to an AC mains power source 12 and an AC load 14. The system 10 includes a DC-AC inverter 16 coupled to the AC mains power source 12 and the AC load 14, and a DC-DC converter 18 coupled to the DC-AC inverter 16. A battery 20 is coupled to the DC-DC converter 18. The DC-DC converter 18 may include a low frequency transformer for stepping up the voltage provided by the battery 20. In one embodiment, the system 10 may be configured to operate with a high frequency transformer. In another embodiment, the system 10 may be configured to operate with a low frequency transformer.

The system may form a part of a standby UPS. The AC mains power source 12 is typically a utility mains that provides an AC electric power supply, for example, single-phase or three-phase 120/240 V at 50/60 Hz, to the UPS. The load 14 is any power-consuming device or combination of devices, such as a computer, television, refrigerator, heating/ventilation/air conditioning system (HVAC), or lighting system. The load 14 may be a critical load that requires a continuous (or nearly continuous) supply of power so that it may continue to operate during black-outs, brown-outs, or whenever the AC mains power source 12 is unavailable. Power may be supplied to the load 14 directly from the AC mains power source 12, or from the battery 20. A switch 22 may be controlled by a control unit 24 for connecting and disconnecting the AC mains power source 12 from the load 14 and other components of the system 10. For example, the control unit 24 may be configured to detect a loss of AC mains power 12 or an under-voltage condition wherein the source of power for the load 14 is automatically switched over to the battery 20. The battery and DC-AC inverter 16 therefore can be said to only power the load 14 on a standby or as-needed basis. When the AC mains power source 12 is available, it may be used to charge the battery 20. By contrast, an online UPS typically uses the battery 20 (e.g., a DC power source) to provide power to the load 14 via the DC-AC inverter 16 at all times, and the battery is charged from the AC mains power source 12 (when it is available). The load 14 experiences no significant power interruption when the AC mains power source 12 fails because the battery 20 is available to provide a source of power. Online UPS units are more complex and expensive than standby UPS units, and may sometimes provide features not typically available in standby UPS units. The control unit 24 may also provide control and monitoring functions for the power system 10, including, but not limited to, mains/battery switching, battery charging, load monitoring, and status/utilization reporting (e.g., locally or remotely through an interface, not shown). The system 10 may also provide surge and lightning protection for the load 14.

In a conventional inverter, the output voltage changes with respect to changes in the power drawn by the load 14. However, it is desirable to maintain the output voltage of the inverter at or near the rated voltage (e.g., 110V AC or 220V AC) to avoid damaging equipment and to ensure proper operation. Therefore, according to one embodiment, the inverter 16 includes a plurality of semiconductor switches that are controlled using pulse width modulated (PWM) control signals. The output voltage is regulated by changing the width of the switching control signal (pulse) in response to changes in the output that are caused by the load. An appropriate change in the pulse width of the switching pulse will negate or substantially offset the changes in the output voltage, and the inverter output voltage will remain substantially constant irrespective of variations in the load.

FIG. 2A is a schematic diagram of a portion of the system 10, including the DC-AC inverter 16, according to one embodiment of the present disclosure. FIG. 2A is simplified to only show one possible configuration of the system 10 where the load 14 is being powered by the battery 20 through a low frequency transformer 30, which may be part of the DC-AC inverter 16 described above with respect to FIG. 1. The circuit may further include a capacitor 31, which in conjunction with the leakage inductance of the transformer 30 forms an LC filter. The portion of the system 10 shown also includes a PWM controller 32 connected to the battery 20 and the inverter 16. The DC-AC inverter 16 includes a plurality of switching devices 36, 38, 40, and 42 that are coupled to and controlled by the PWM controller 32 using signals A, B, C, and D, respectively (e.g., switch on/closed or switch off/open).

The PWM controller 32 monitors the battery 20 voltage and an output of the inverter 16, which may be a voltage across the load 14, such as indicated at 34. The switching devices 36, 38, 40, and 42 may be insulated gate bipolar transistor (IGBT) devices, metal-oxide-semiconductor field-effect transistor (MOSFET) devices having anti-parallel diodes, or similar devices.

The system 10 may include a clamping feature that is activated by turning on switching devices 38 and 42 at the same time, which will short the inverter output 34 to ground. The clamping feature prevents the output 34 from exceeding a certain magnitude by shifting the output waveform about a fixed voltage. In some embodiments, the clamping feature is used to pull the output voltage 32 low. This is useful because the inverter 16 is configured to drive the output high only and/or may cause the output 34 to float when the inverter is turned off (e.g., by the PWM controller 32).

As will be understood by one of skill in the art, the ratio of real power to apparent power in an AC power system is called the power factor. Where the power factor is less than unity (1), the load is considered to have reactive properties that cause some of the power drawn by the load to be returned to the power system, which is often wasted as heat. Therefore, it is advantageous to design loads having active power factor correction (or corrector) (PFC) circuitry that increases the power factor of the system by controlling the amount of power consumed by the load. However, certain types of active PFC switching power supplies (SPS) are not compatible with the waveforms produced by conventional UPS units, in particular, non-sinusoidal or certain simulated sinusoidal waveforms, such as square waveforms, which are relatively simple to generate using a conventional inverter. Further, because the capacity of the UPS to produce power is limited (e.g., by the capacity of the battery 20), certain active PFC devices having varying power demands may detrimentally affect the output voltage of the UPS (e.g., by causing the output voltage to become too high or too low). For example, when a PFC device reduces or stops drawing a large current, the output voltage may begin to rise toward a desired or nominal peak or root mean square (RMS) output voltage. This voltage increase should be arrested before the desired or nominal voltage is exceeded, at least for protecting the load from an overvoltage condition. Therefore, according to various embodiments, it is appreciated that there is a need for a UPS, particularly in a low-cost standby-type unit, that can generate a substantially sinusoidal output simulating AC mains power, as well as maintaining output voltage regulation when certain active PFC devices are connected. It is also appreciated that, in general, any output having a lower rate of voltage change over time (i.e., dv/dt) than a square wave can be advantageous for the operation of certain loads, such as active PFC devices.

Thus, according to one embodiment, the PWM controller 32 is configured to cause the inverter 16 to generate an output voltage having a waveform that is substantially sinusoidal, regardless of the type of load coupled to the output 34 (e.g., including an active PFC load). The substantially sinusoidal output is desirable because it is similar to the sinusoidal waveform normally provided by the AC mains power source 12, and therefore enables the system 10 to provide a voltage waveform similar to mains power when the load 14 is being powered from the battery 20. The PWM controller 32, or other control unit, may be further configured to sense the output voltage 34 and to either modify the PWM control signals or turn the inverter 16 off and clamp the output 32 to a fixed voltage when either the RMS output voltage level of the system 10 reaches or exceeds a pre-determined RMS output voltage, or when the peak instantaneous output voltage level of the system 10 reaches or exceeds a pre-determined peak output voltage level. Accordingly, the PWM controller 32 may control the system 10 to regulate the output voltage level to a desired steady-state RMS voltage level and/or to prevent the peak voltage level across the load 14 from exceeding a pre-defined maximum peak output voltage level. It should be understood that, according to some embodiments, the output may optionally be configured to obtain semi-sinusoidal or non-sinusoidal shapes, such as trapezoidal, which in general have a lower rate of voltage change over time (i.e., dv/dt) than a square wave.

The switching devices 36, 38, 40, and 42 may be interconnected in a full-bridge configuration, or, optionally, in a half-bridge configuration (not shown). Switching devices 36, 38, 40, and 42 are each operated with PWM control signals A, B, C, and D, respectively, to generate the desired AC voltage having a substantially sinusoidal waveform across the load 14 (i.e., at the inverter output 34) using power from the battery 20. The sinusoidal waveform is generated by the PWM controller 32 using one or more lookup tables containing sinusoidal reference voltages, as will be described in further detail below. The system 10 may optionally include a low-pass filter (not shown) for filtering the power that is output to the load 14.

Figure 2B:
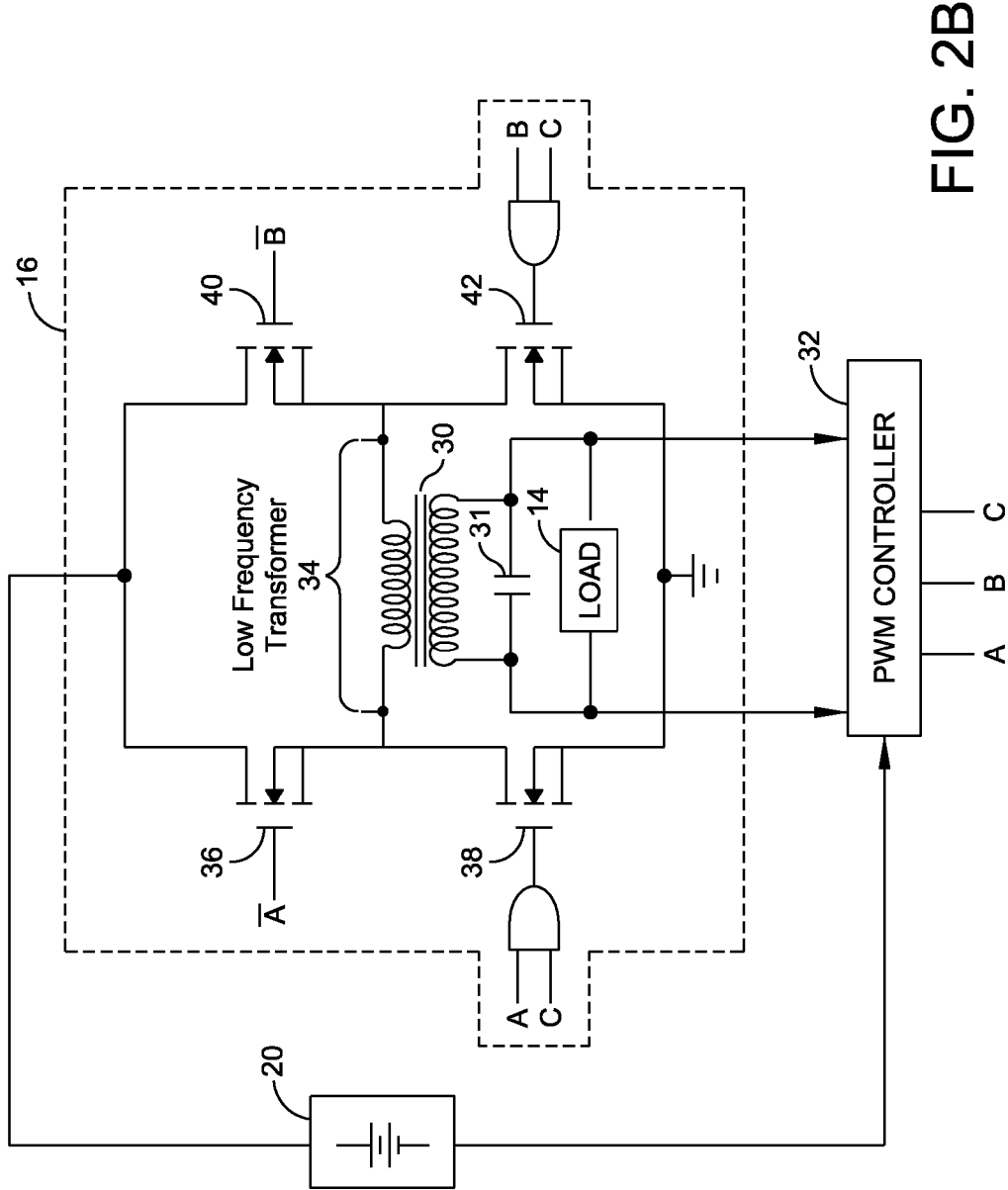
FIG. 2B is a schematic diagram of a portion of the system of FIG. 1 in accordance with another embodiment of the present disclosure.

FIG. 2B is a schematic diagram of a portion of the system 10 according to another embodiment of the present disclosure. The circuit shown in FIG. 2B is substantially similar to the circuit of FIG. 2A, except that the PWM controller 32 has only three outputs A, B, and C that are connected to the switching devices 36, 38, 40, and 42 as shown. The input of switching device 36 is an inverted signal of output A; the input of switching device 40 is an inverted signal of output B; the input of switching device 38 is a logical AND of outputs A and C; and the input of switching device 42 is a logical AND of outputs B and C. In one example, outputs A and B may be general purpose outputs, and output C may be the PWM switching signal.

Example 1

Figure 3:
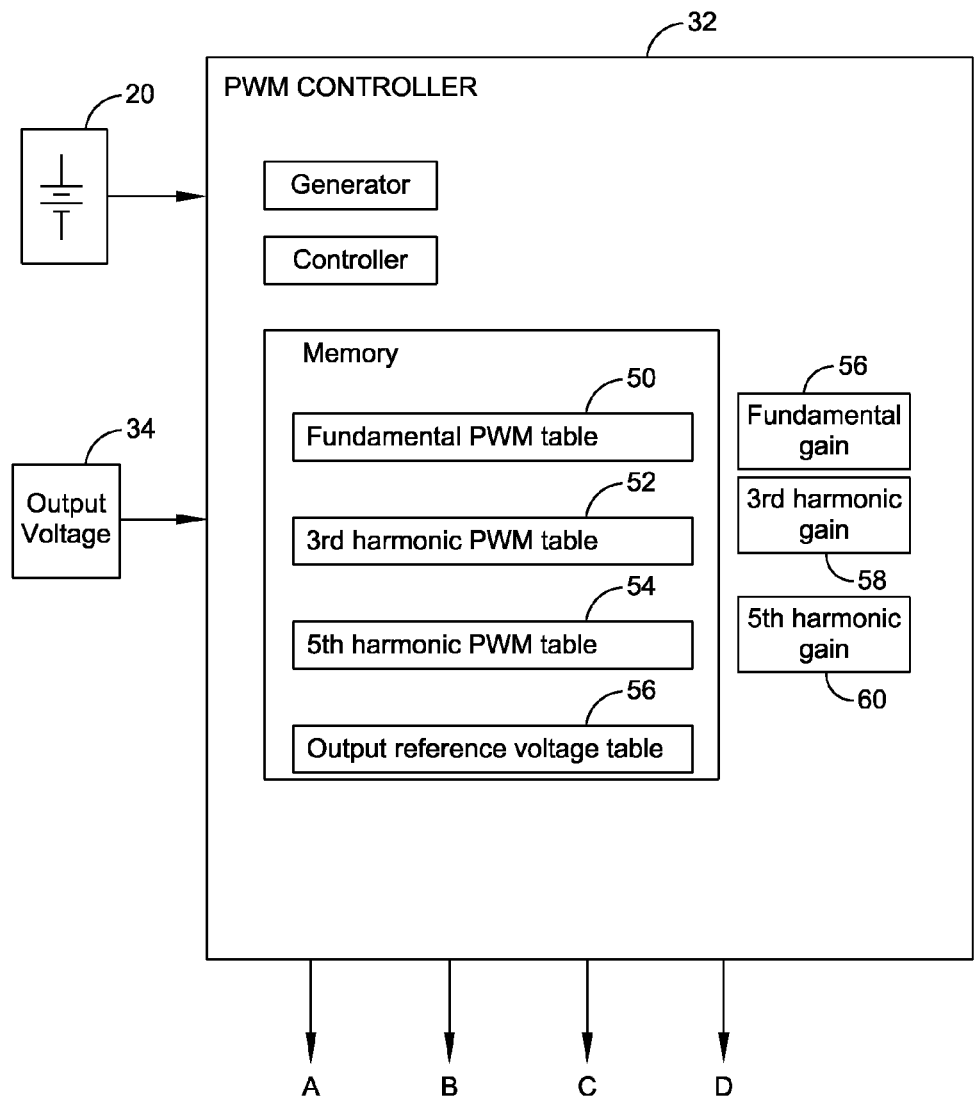
FIG. 3 is a schematic diagram of a controller in accordance with another embodiment of the present disclosure.

Referring to FIG. 3, according to one embodiment, the PWM controller 32 utilizes a fundamental frequency PWM table 50, a $3^{rd}$ harmonic PWM table 52, and a $5^{th}$ harmonic PWM table 54 to generate the PWM signals A, B, C, and D. The tables each define a series of pulse widths (e.g., in units of time, ticks, or phase angles) that, when combined and applied to the switching devices 36, 38, 40, and 42 of the inverter 16, will cause the output waveform to be substantially sinusoidal at the fundamental power output frequency (e.g., 60 Hz in the United States) and with the desired RMS output voltage, as will be understood by one of skill in the art. The values in each table 50, 52, and 54 are predetermined based on the operating characteristics of the system 10, such as the rated voltage and current capacity of the system, and may be referred to herein as baseline values or baseline pulse widths. In some embodiments, the values in the fundamental PWM table 50, the $3^{rd}$ harmonic PWM table 52, and/or the $5^{th}$ harmonic PWM table 54 may be added together to alter the shape of the output waveform (e.g., to increase or decrease the rising and/or falling time of the waveform), and accordingly, the RMS output voltage. Further, a gain variable 56, 58, and 60 may be used as a scaling factor to adjust the values of each respective table 50, 52, and 54 to achieve the desired output, such as shown in the flow diagrams of FIGS. 4A-4C. For example, the $3^{rd}$ harmonic PWM table 52 may be used to increase or decrease the rising and/or falling time of the waveform within the 0 to 45 and 135-180 degree angles.

In one example, the output voltage 34 of the system 10 is monitored during inverter operation (e.g., while the load 14 is powered from the battery 20 in a standby UPS). In some embodiments, the inverter is operated for only a portion of the output cycle, which is sometimes known as the duty on period. The duty on period may, for example, include approximately the first half of a half-cycle of the output (e.g., when the waveform is between approximately zero and approximately 90 degrees). During the duty on period, the inverter is operated using the sequence of PWM control signals that are stored in the tables 50, 52, and 54 described above. In some embodiments, the $3^{rd}$ harmonic PWM table 52 and/or the $5^{th}$ harmonic PWM table 54 may be used to adjust or fine tune the shape of the output voltage 34 waveform. Such adjustment is desirable to maintain the waveform as close to a desired or reference waveform as possible when, for example, the output is affected by the load.

As will be understood by one of skill in the art, the RMS value of the output voltage 34 is the square root of the mean of the squares of the instantaneous output voltage 34 over an output cycle or portion thereof (e.g., a half-cycle). Therefore, in one embodiment, the output voltage 34 is sampled at regular time intervals during the output cycle (e.g., 32 times per half-cycle or 64 times per full cycle). Thus, the squared mean of the squares of the sampled output voltages can be calculated according to the following equation:

$$V_{mean}^2 = \frac{\Sigma v_0^2 + \ldots + v_n^2}{32}$$

The RMS output voltage for a sinusoidal output voltage waveform having a peak of $V_{peak}$ can be calculated according to the following equation:

$$V_{RMS} = V_{peak}/\sqrt{2}$$

The peak voltage output, $V_{peak}$, can be measured at the point of the sinusoidal signal where the slope is zero (i.e., dv/dt=0) at the fundamental, or output, frequency, and thus used to evaluate $V_{RMS}$. Typically, the peak occurs at one of the orthogonal angles of the waveform (e.g., 90 or 270 degrees). Further, $V_{RMS}$ can be evaluated at intermediate angles (e.g., 45 or 135 degrees) by applying the corresponding sine function to the measured output voltage at that angle. Accordingly, the above equation can be rewritten as:

$$V_{peak} = V_{RMS} \cdot \sqrt{2} \approx V_{RMS} \cdot 1.414$$

Once the output voltage 34 reaches a desired or reference RMS output voltage, the inverter is turned off and the output 34 is clamped, e.g., to zero volts. Depending on the angle of the output voltage 34 signal at the point in time where the desired RMS output voltage is reached, the output voltage is compared to a reference voltage according to one of the following equations:

$$V_{out} > V_{desired\ RMS} * 1.414, \text{ where the peak occurs at an angle of 90 or 270 degrees;}$$

$$V_{out} > V_{desired\ RMS} * 1.414 * \sin(45), \text{ if the angle is 45 or 225 degrees; and}$$

$$V_{out} > V_{desired\ RMS} * 1.414 * \sin(135), \text{ if the angle is 135 or 315 degrees.}$$

If the output voltage $V_{out}$, measured at one of a plurality of samples, reaches or exceeds the desired RMS output voltage, one or more of the gain variables 56, 58, and 60 may be used to modify the values of each respective table 50, 52, and 54, as mentioned above, which in turn will modify the gain of the output voltage generated using the PWM control signals. Samples may be taken, for example, 32 times in each half cycle of the output voltage waveform. The output voltage $V_{out}$ may be measured at its peak (e.g., 90 and 270 degrees), as well as at intermediate angles (e.g., 45, 90, and 135 degrees) for increased waveform shape and output RMS voltage control. The respective gain variables 50, 52, and 54, when applied to the baseline values of each table 50, 52, and 54, enable the PWM processor 32 to alter the shape of the output signal and, accordingly, control the RMS output voltage. One such method for doing so is illustrated in the flow charts of FIGS. 4A, 4B, 4C, and 4D.

Figure 4A:
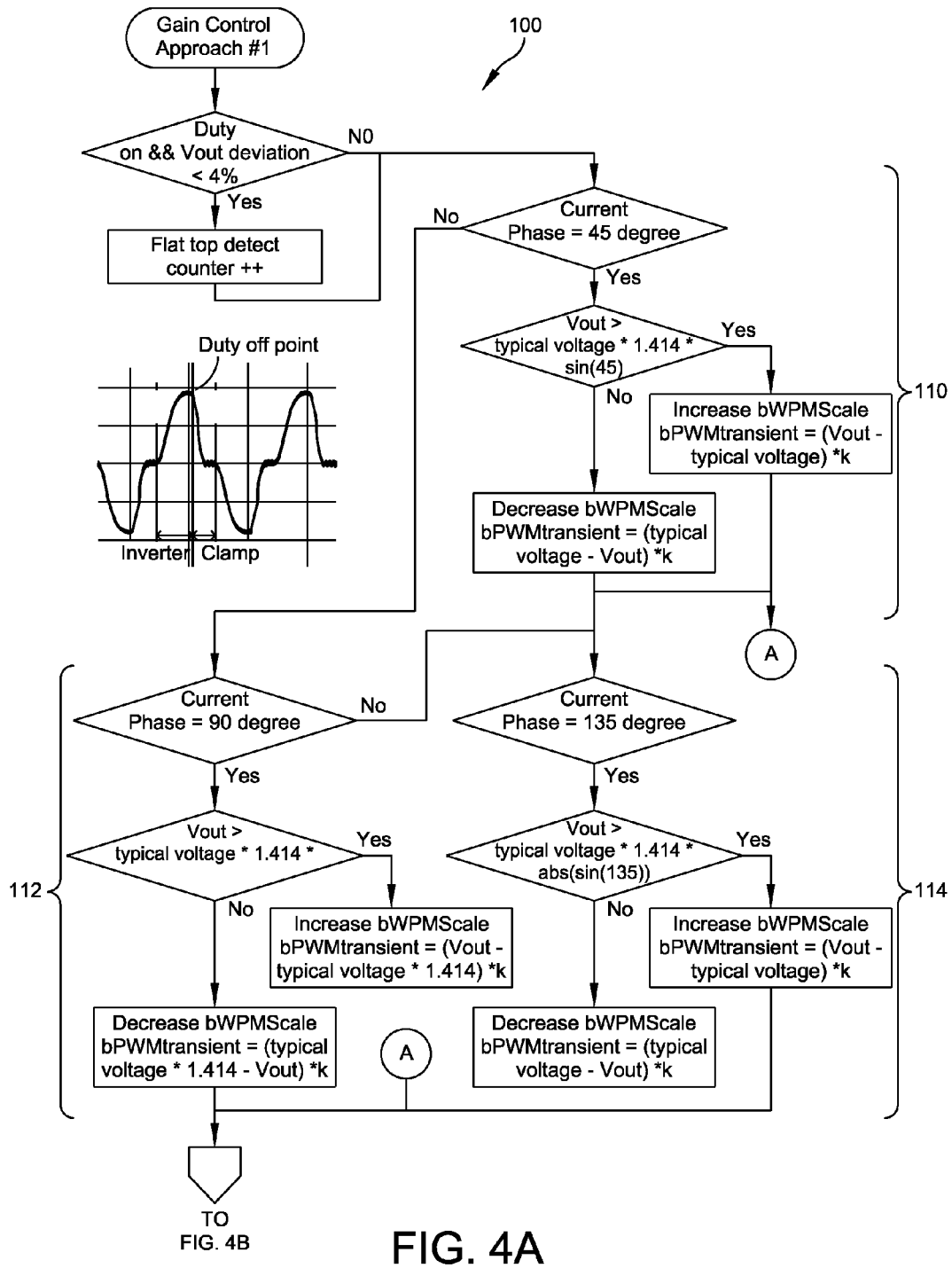
FIGS. 4A-4C illustrate a flow diagram of a power converter process in accordance with one embodiment of the present disclosure.
Figure 4B:
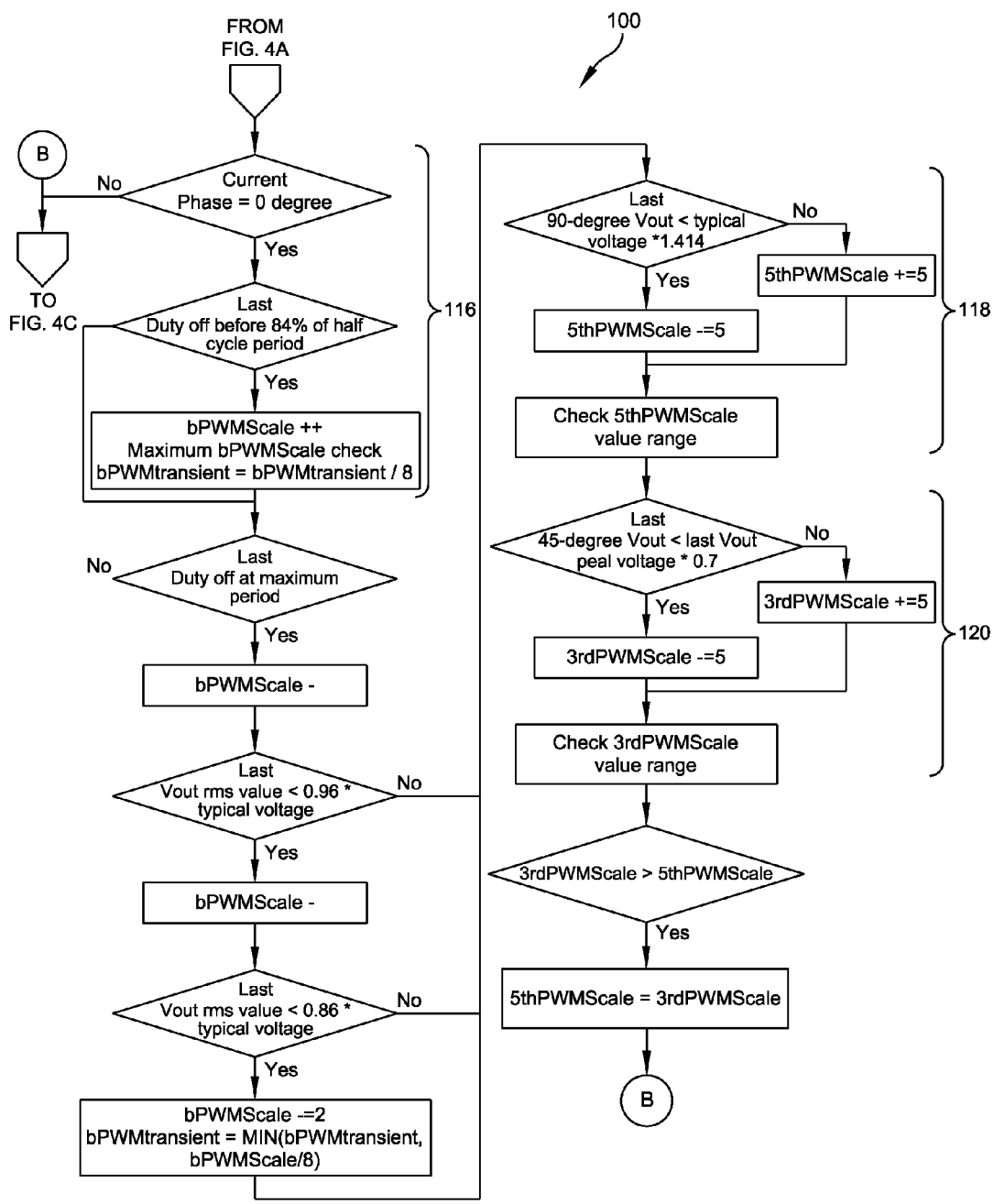
Figure 4C:
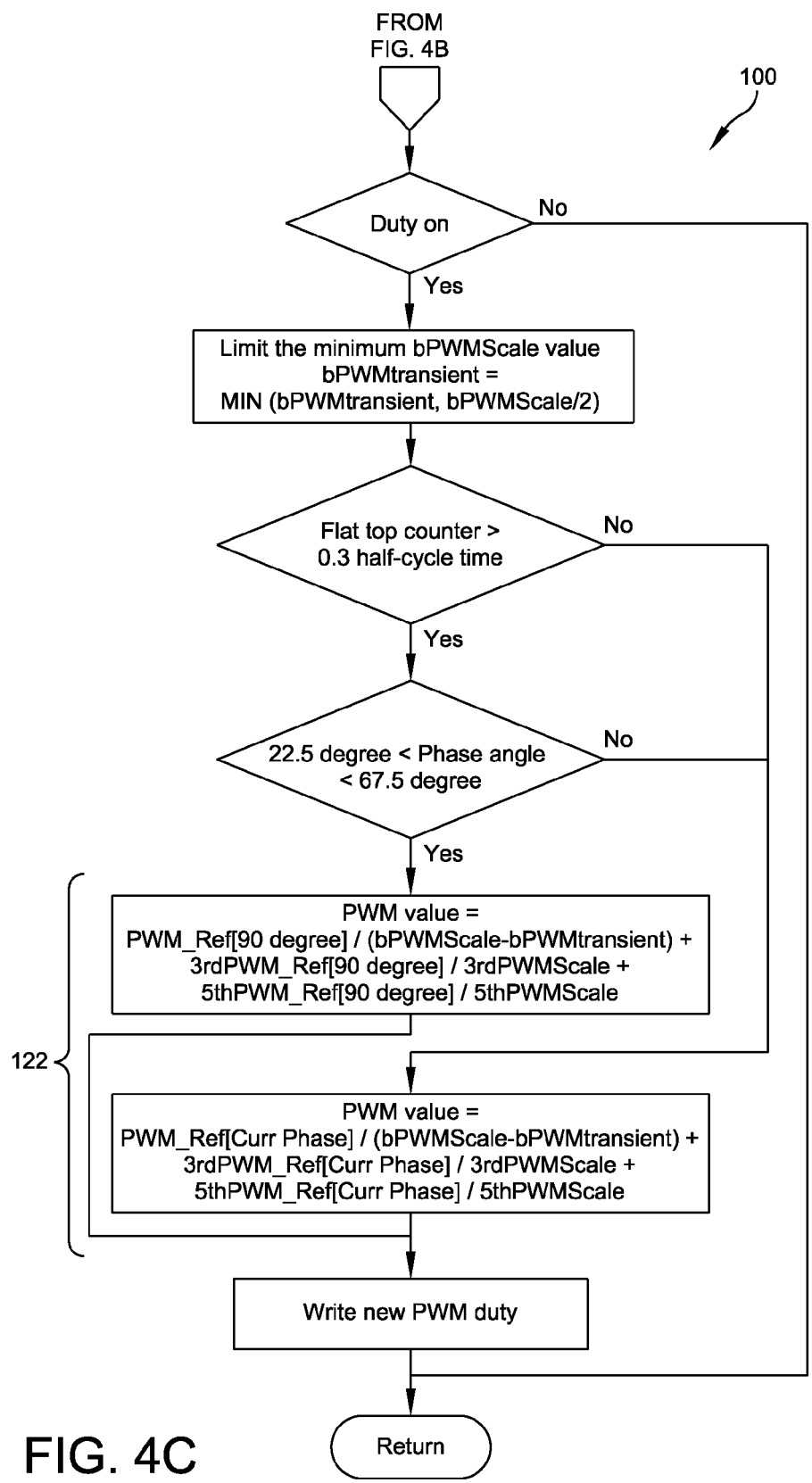

FIGS. 4A, 4B, and 4C show a flow chart, according to one embodiment, representing a routine 100 that is to be performed at each of a plurality of time intervals during the duty on period. The routine 100 may, for example, be serviced by an interrupt on a processor within the UPS. The interrupt may be driven by a clock that runs at a rate of 64 ticks per cycle of the output voltage waveform. The routine 100 is executed during at least one interrupt.

The routine 100 can generally be described as follows. At each instance of execution, the instantaneous output voltage is sensed and compared to a reference RMS voltage. For example, as generally indicated at 110, if the current phase of the output voltage waveform is 45 degrees, the instantaneous output voltage is compared to the reference RMS voltage multiplied by the sine of 45 degrees. If the instantaneous output voltage is greater than the compared reference voltage, a scaling factor is increased; otherwise, the scaling factor is decreased. This scaling factor will later be applied to the PWM control signals for adjusting the gain of the output voltage. This adjustment will keep the output voltage generated by the UPS substantially at a desired, or reference, voltage. Similar comparisons are performed if the current phase of the output voltage waveform is 90 degrees, 135 degrees, or zero degrees, indicated generally at 112, 114, and 116 respectively. It should be understood that the flow chart as shown is for one half-cycle of the output voltage waveform, and that each half-cycle (e.g., zero to 180 degrees and 180 to 360 degrees) may be handled in the same manner. Further fine adjustments to the shape of the output voltage waveform may be affected by changing the gain of the third and/or fifth harmonic PWM control signals, as generally indicated at 118 and 120, respectively. During the duty on period, the scaling factor(s) are applied to the PWM control signals, as generally indicated at 122.

The routine 100 may be implemented by a service interrupt routine that executes periodically on a processor of the system 10, which may include the PWM controller 32. For example, the service interrupt routine may cause method 100 to execute 64 times per period of the output voltage waveform (32 times per half-cycle). A duty on period is defined as a period of time during which the inverter 16 is operated using the PWM control signals A, B, C, and D, and a duty off period is defined as a period of time where the system 10 is clamping the output voltage 34 to a fixed voltage. Some embodiments may be implemented in hardware, firmware, software, or in the form of instructions that are stored on a computer-readable medium (e.g., memory, hard disk, and so forth), which, when executed by the processor, cause the processor to perform the method 100, other methods as described herein, and methods having similar functionality to the methods described herein. The processor may be, for example, a general purpose processor, or an application-specific processor, such as is typically provided in commercial UPS units.

Figure 4D:
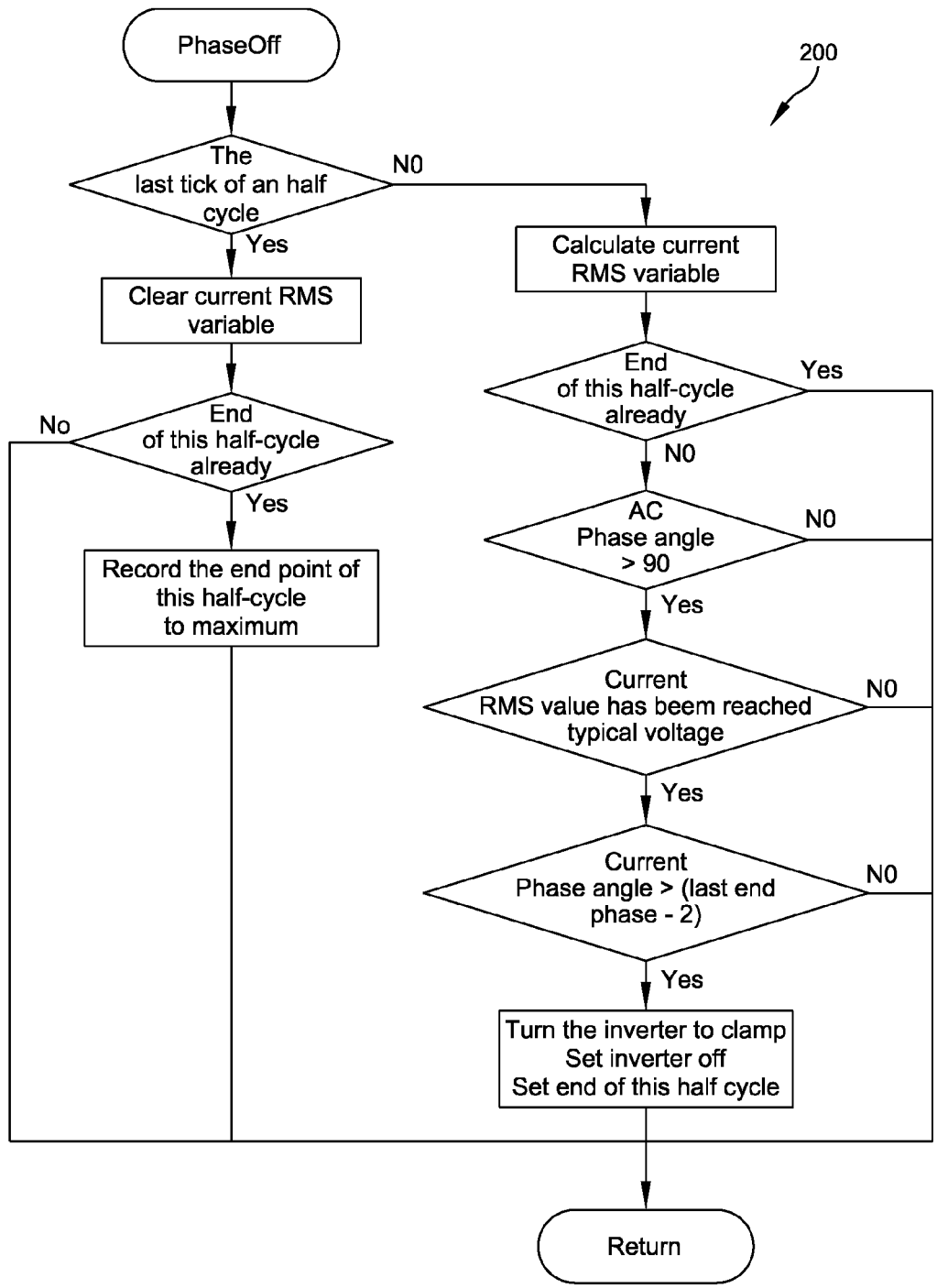
FIG. 4D illustrates a flow diagram of the power converter process of FIGS. 4A-4C in accordance with another embodiment of the present disclosure.

FIG. 4D shows another flow chart representing a routine 200 that, according to one embodiment, is to be performed at each of a plurality of time intervals during the duty on period. The routine 200 may, for example, be serviced by an interrupt on a processor within the UPS. The interrupt may be driven by a clock that runs at a rate of 64 ticks per cycle of the output voltage waveform. The routine 200 is executed during at least one interrupt.

The routine 200 can be generally described as follows. When the output voltage of the system 10 reaches a maximum value, the inverter is turned off and the output is claimed to an RMS reference voltage, such as described above with reference to FIGS. 2A and 2B. At this time, routine 200 performs certain housekeeping functions that support routine 100 described above, as well as routine 300 described below. In particular, the phase angle at which the output voltage has reached the maximum RMS reference voltage is recorded. This recorded phase angle will be used in future executions of the routines 100 and 300 for adjusting the PWM control signals to maintain the substantially sinusoidal shape of the output voltage waveform, as well as to prevent the output voltage from substantially exceeding the desired, or reference, RMS voltage for the system 10.

The routine 200 may be implemented by at least some of the embodiments described above with respect to Example 1, as well as certain embodiments described below with respect to Example 2.

Example 2

Referring again to FIG. 3, according to another embodiment, the PWM controller 32 utilizes the fundamental frequency PWM table 50, the $3^{rd}$ harmonic PWM table 52, and an output reference voltage table 56 to generate the PWM signals A, B, C, and D. Due to the low drive capacity of a typical standby UPS, when the load 14 draws more power, the UPS may have difficulty maintaining the peak output voltage, especially as the battery charge is drawn down by the load. Accordingly, the RMS output voltage will fall as the peak output voltage is clipped. In at least one embodiment, to compensate for this, the output waveform is stepped or ladder-shaped to preserve a substantially sinusoidal shape.

Figure 5:
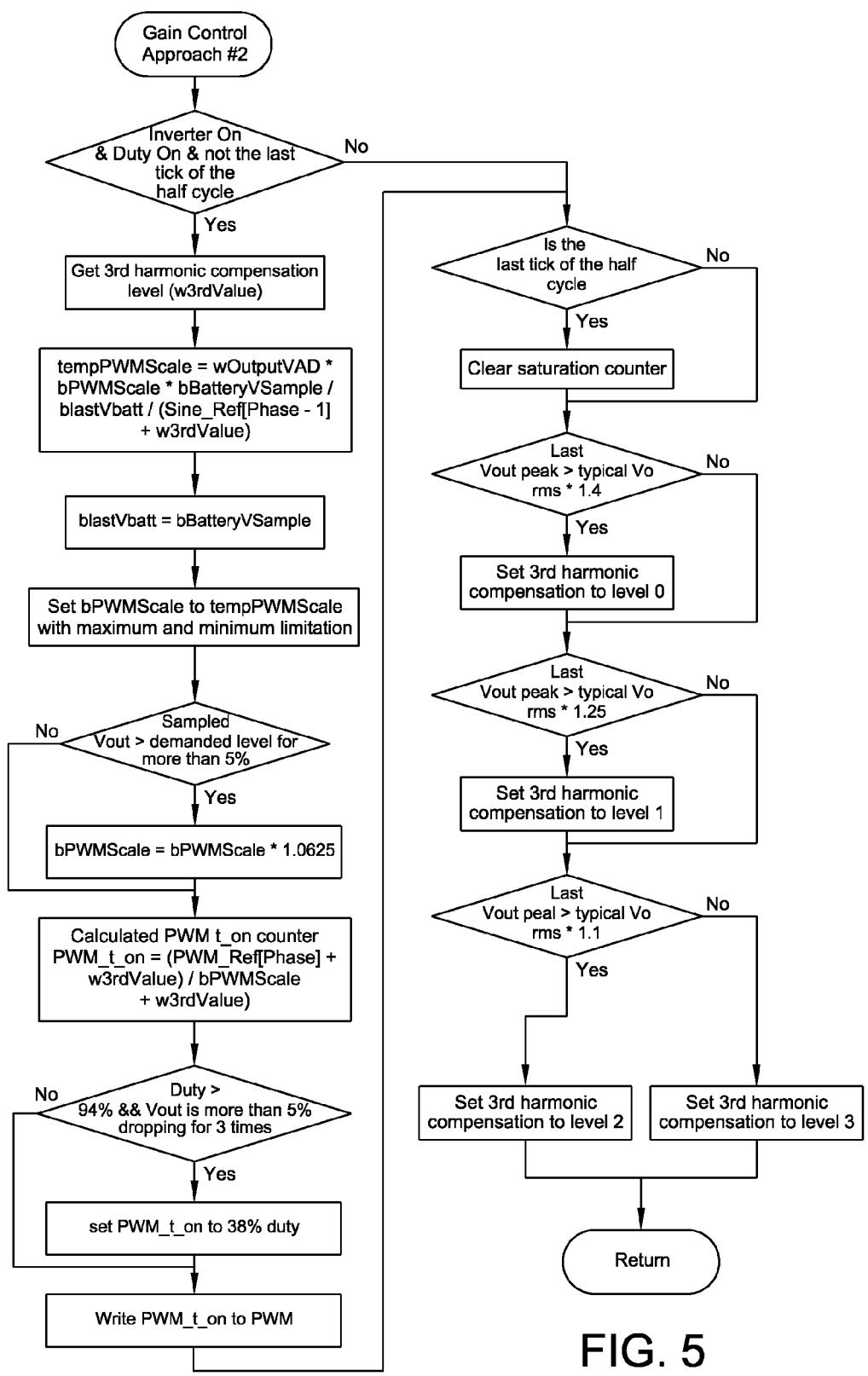
FIG. 5 illustrates a flow diagram of a power converter process in accordance with another embodiment of the present disclosure.

As discussed above, the tables 50 and 52 each define a series of pulse widths (e.g., in units of time, ticks, or phase angles) that, when combined and applied to the switching devices 36, 38, 40, and 42 of the inverter 16, will cause the output waveform to be substantially sinusoidal at the fundamental power output frequency (e.g., 60 Hz in the United States) and with the desired RMS output voltage, as will be understood by one of skill in the art. The output reference voltage table 56 defines a reference voltage with respect to a desired sinusoidal output voltage for the system 10. The values in each table 50, 52, and 56 are pre-determined based on the operating characteristics of the system 10, such as the rated voltage and current capacity of the system, and may be referred to herein as baseline values or baseline pulse widths. In some embodiments, the values in the fundamental PWM table 50, and/or the $3^{rd}$ harmonic PWM table 52 may be added together to alter the shape of the output waveform (e.g., to increase or decrease the rising and/or falling time of the waveform), and accordingly, the RMS output voltage. Further, the gain variables 56 and 58 may be used to modify the values of each respective table 50 and 52 as is shown in the flow diagram of FIG. 5. For example, the $3^{rd}$ harmonic PWM table 52 may be used to increase or decrease the rising and/or falling time of the waveform within the 0 to 45 and 135 to 180 degree angles. The gain of the $3^{rd}$ harmonic PWM table 52 is related to the peak output voltage $V_{out}$ (i.e., lower gain causes a higher peak output voltage).

In one example, during operation, the output voltage 34 of the system 10 is monitored during inverter operation. As described above in Example 1, the voltage output, $V_{out}$, can be measured at each of a plurality of output voltage sample time intervals (e.g., 32 samples in a half cycle of the output voltage waveform), and thus used to evaluate $V_{RMS}$:

$$V_{mean}^2 = \frac{\Sigma v_0^2 + \ldots + v_n^2}{32}$$

where $V_0$-$V_n$ represents the instantaneous output voltage at each sample time interval. As described above, for a sinusoidal output, $V_{out}=V_{RMS}\cdot\sqrt{2}$ $V_{RMS}\cdot 1.414$.

Once the output voltage 34 reaches a desired RMS output voltage, the inverter is turned off and the output 34 is clamped, e.g., to zero volts. The monitored output voltage is used to calculate a new gain for the PWM control signals A, B, C, and D during each interrupt service routine (such as described above) according to the following equation:

$$gain(n)=((V_{out}*gain(n-1))/(V_{fund}[n-1]+V_{3rd}[n-1])(V_{batt}(n)/V_{batt}(n-1)),$$

where n is the number of ticks elapsed since the beginning of the current output voltage waveform period, $V_{fund}[n]$ is a value of the fundamental PWM table 50 corresponding to the $n^{th}$ tick, $V_{3rd}[n]$ is a value of the $3^{rd}$ harmonic PWM table 52 corresponding to the $n^{th}$ tick, $V_{batt}(n)$ is the battery voltage during the $n^{th}$ tick. The gain is applied as a divisor to the corresponding value of the tables 50 and 52 for generating the next PWM pulse width control signal.

According to at least one embodiment of the present disclosure, it is appreciated that the techniques described herein for generating an output voltage, in particular a voltage having a substantially sinusoidal or trapezoidal waveform, can be implemented in existing standby UPS devices or other existing power conversion circuits with little or no physical modifications. Rather, the disclosure can be implemented primarily in software executed by a processor coupled to the circuit or UPS. Such an implementation reduces the cost of manufacture and operation of the UPS. Further, the techniques described herein improve UPS compatibility with active PFC devices in contrast to conventional square-wave output UPS devices.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, it should be appreciated that the techniques described herein may be implemented in devices other than UPS units, such as power converters that may not necessarily have a battery providing an alternative source of power. Further, although the disclosed embodiments generally discuss generating outputs having substantially sinusoidal waveforms, it should be understood that waveforms that are only partially sinusoidal, or non-sinusoidal, may be generated using variations of the disclosure that will be appreciated by one of skill in the art (e.g., by modifying the PWM control signals accordingly). Accordingly, the foregoing description and drawings are by way of example only.

What is claimed is:

1. A method of operating an uninterruptible power supply (UPS), the method comprising:
generating, during a portion of an output cycle, a substantially sinusoidal output voltage responsive to a plurality of pulse width modulation (PWM) control signals provided to a power conversion circuit of the UPS;
comparing the output voltage to a reference root mean square (RMS) voltage at each of a plurality of time intervals during the portion of the output cycle;
calculating a PWM control signal scaling factor based on each of the comparisons to the reference RMS voltage;
maintaining the output voltage at substantially the reference RMS voltage by applying the calculated PWM control signal scaling factor to at least one of the plurality of PWM control signals;
detecting that the output voltage has reached a maximum output voltage level;
clamping the output voltage by controlling an inverter to reduce the output voltage to a steady state output voltage reference level; and
recording a phase angle at which the output voltage has reached the maximum output voltage level.

2. The method of claim 1, wherein at least one of the plurality of PWM control signals is configured to generate a fundamental frequency component of the output voltage.

3. The method of claim 2, wherein at least one of the plurality of PWM control signals is further configured to generate a third harmonic component of the output voltage.

4. The method of claim 3, further comprising maintaining the output voltage at substantially the reference RMS voltage at one of a phase angle of approximately 45 degrees and a phase angle of approximately 135 degrees by calculating a third harmonic scaling factor based on the comparisons to the reference RMS voltage, and applying the third harmonic scaling factor to at least one of the plurality of PWM control signals.

5. The method of claim 3, further comprising maintaining the output voltage at substantially the output voltage reference within a first phase angle range of between approximately zero degrees and approximately 45 degrees and within a second phase angle range of between approximately 135 degrees and approximately 180 degrees by calculating a third harmonic scaling factor based on the comparisons to the output voltage reference, and applying the third harmonic scaling factor to at least one of the plurality of PWM control signals.

6. The method of claim 3, wherein at least one of the plurality of PWM control signals is further configured to generate a fifth harmonic component of the output voltage.

7. The method of claim 6, further comprising maintaining the output voltage at substantially the reference RMS voltage at one of a phase angle of approximately 90 degrees and a phase angle of approximately 270 degrees by calculating a fifth harmonic scaling factor based on the comparisons to the reference RMS voltage, and applying the fifth harmonic scaling factor to at least one of the plurality of PWM control signals.

8. The method of claim 1, further comprising maintaining the substantially sinusoidal shape of the output voltage by calculating a transient response scaling factor based on a transient response of the output voltage to a change in a load, and applying the transient response scaling factor to at least one of the plurality of PWM control signals.

9. An uninterruptible power supply system, comprising:
a backup power source;
an output configured to provide an AC output voltage to a load;
a power conversion circuit coupled to the backup power source and the output for generating the AC output voltage; and
means for controlling the power conversion circuit to generate, during a portion of an output cycle, a substantially sinusoidal output voltage using a plurality of pulse width modulation (PWM) control signals, detecting that the output voltage has reached a maximum output voltage level, clamping the output voltage by controlling an inverter to reduce the output voltage to a steady state output voltage reference level, and recording a phase angle at which the output voltage has reached the maximum output voltage level.

10. An uninterruptible power supply (UPS) system, comprising:
a backup power source;
an output configured to provide a substantially sinusoidal AC output voltage to a load;
a power conversion circuit coupled to the backup power source and the output for generating the AC output voltage from the backup power source in a backup mode of operation; and
a controller coupled to the power conversion circuit, the controller configured to:
operate the power conversion circuit during a portion of an output cycle using a plurality of pulse width modulation (PWM) control signals that when applied to the power conversion circuit causes the AC output voltage to be generated;
compare the AC output voltage to a reference voltage at each of a plurality of time intervals during the portion of the output cycle;
calculate a PWM control signal scaling factor based on each of the comparisons to the reference voltage;
maintain the AC output voltage at substantially the reference voltage by adjusting a width of at least one of the PWM control signals using the PWM control signal scaling factor;
detect that the output voltage has reached a maximum output voltage level;
clamp the output voltage by controlling an inverter to reduce the output voltage to a steady state output voltage reference level; and
record a phase angle at which the output voltage has reached the maximum output voltage level.

11. The system of claim 10, wherein the controller is further configured to maintain the AC output voltage at substantially the first reference voltage at one of a phase angle of approximately 45 degrees and a phase angle of approximately 135 degrees by calculating a third harmonic scaling factor based on comparisons to the first reference voltage, and to adjust a width of the at least one of the PWM control signals using the third harmonic scaling factor.

12. The system of claim 11, wherein the controller is further configured to maintain the AC output voltage at substantially the first reference voltage at one of a phase angle of approximately 90 degrees and a phase angle of approximately 270 degrees by calculating a fifth harmonic scaling factor based on comparisons to the first reference voltage, and to adjust the width of the at least one of the PWM control signals using the fifth harmonic scaling factor to.

13. The system of claim 10, wherein the controller is further configured to calculate a transient response scaling factor based on a transient response of the AC output voltage to a change in the load, and to adjust a width of the at least one of the PWM control signals using the transient response scaling factor.

14. The system of claim 10, wherein the controller is further configured to generate a plurality of PWM control signals to control the power conversion circuit to generate the substantially sinusoidal AC output voltage.

15. The system of claim 10, wherein the controller is further configured to generate a plurality of PWM control signals to control the power conversion circuit to generate a substantially trapezoidal waveform.

16. The system of claim 10, wherein the controller is further configured to compare a sensed battery voltage to the first reference voltage at each of the plurality of regular time intervals during the first portion of the output cycle, and to calculate the PWM control signal scaling factor based on the comparison of the sensed battery voltage to the first reference voltage.

17. The system of claim 10, further comprising means for generating the plurality of PWM control signals.

18. The system of claim 17, further comprising a memory coupled to the controller, the memory containing at least one table of values that is to be used by the means for generating the plurality of PWM control signals.

19. The method of claim 1, further comprising updating the PWM control signal scaling factor based on the recorded phase angle.

20. The method of claim 10, wherein the controller is further configured to update the PWM control signal scaling factor based on the recorded phase angle.

* * * * *